UNITED STATES PATENT OFFICE.

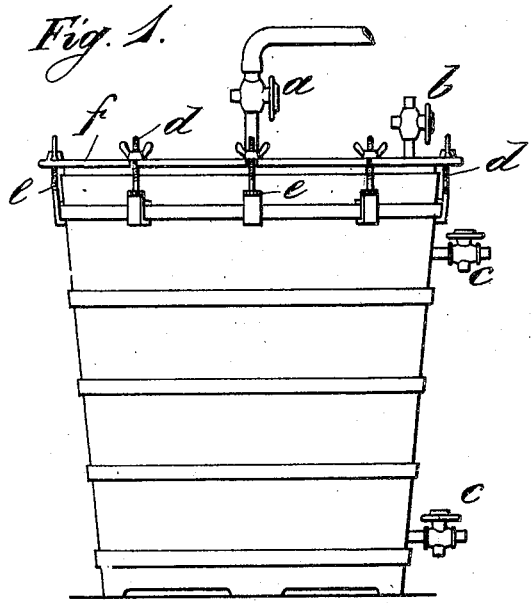
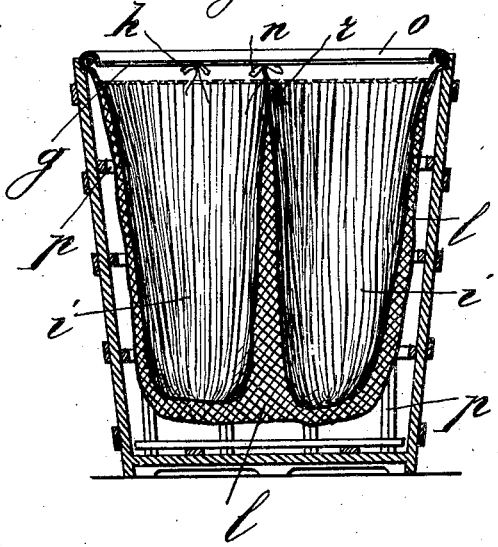
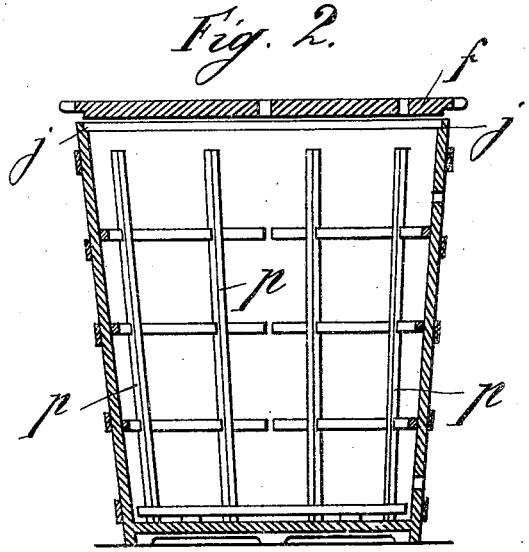
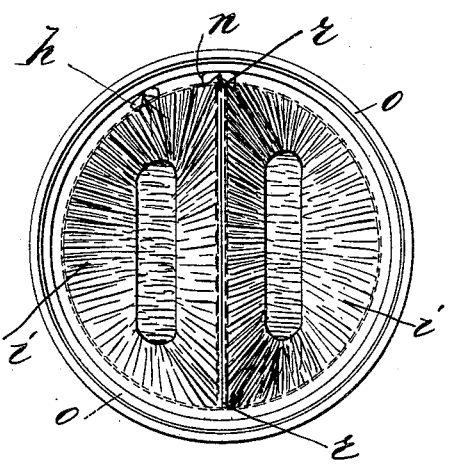

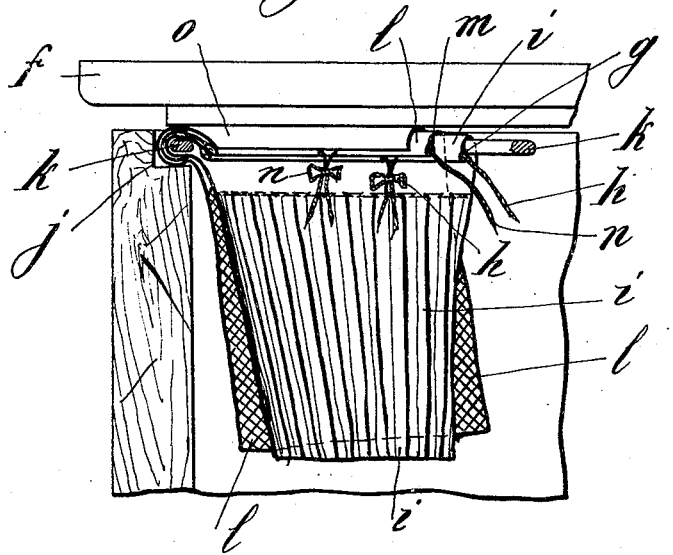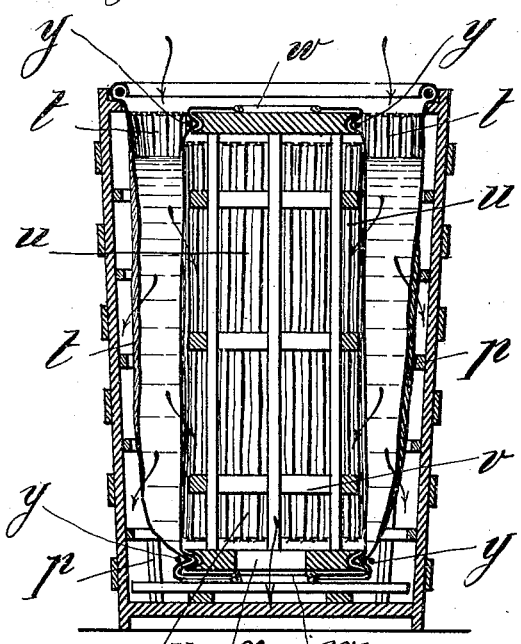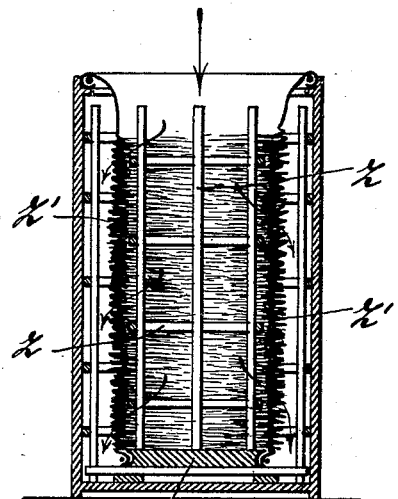

GIORDANO ROSSI, OF MILAN, ITALY.

FILTER.

No. 806,920.	Specification of Letters Patent.	Patented Dec. 12, 1905.

Application filed July 27, 1903. Serial No. 167,119.

*To all whom it may concern:*

Be it known that I, GIORDANO ROSSI, fencing master, a subject of the King of Italy, residing at 9 Viale Monforte, Milan, in the Kingdom of Italy, have invented certain new and useful Improvements in Filters, of which the following is a specification.

This invention relates to a filter more especially intended for the filtration of wines, but which by changing the "filtering member," properly so called, may also serve for the filtration in the same apparatus of the most diverse liquid or semiliquid substances.

The filter in question is characterized by its low cost, by its high efficiency due to the large extent of filtering-surface, and also by the facility with which it may be employed.

The invention is based upon the use of pockets, bags, or sleeves of fabric, which constitute the filtering-surface proper. These bags or sleeves are plaited throughout their entire surface, the number of these plaits and their extent depending upon the area of the filtering-surface which it is required to obtain.

The invention also consists in the employment of a method of suspension and closing of the plaited bags within a vessel of wood or other suitable material, this method of suspension permitting, on the one hand, of forming a tight joint externally in such a manner that no part of the liquid to be filtered is lost, while, on the other hand, the bags are so suspended that the mouth is maintained open and in a state of tension throughout its contour. In this manner the best result is obtainable from the entire filtering-surface.

The accompanying drawings show, by way of example only, several ways of carrying the invention into practice, the bags or sleeves being mounted in a wooden vessel.

Figure 1 is an external elevation. Fig. 2 is a vertical section through Fig. 1. Fig. 3 illustrates a modification, and Fig. 4 is a plan of the same. Fig. 5 is a detail view showing the suspension and closing means for bags provided with longitudinal plaits. Figs. 6 and 7 are modifications hereinafter referred to.

$a$ is the supply-cock for the liquid to be filtered, which enters the apparatus under pressure.

$b$ is an air-discharge cock.

$c\ c$ are cocks for the discharge of the filtered liquid, the upper of which may at the commencement of operations serve also for the flow of air.

$d$ represents hinged bolts for fixing the removable cover $f$ in position.

The apparatus is mounted in the following manner: The upper edge of the mouth of the plaited bag $i$, Fig. 5, provided in the usual manner with a sleeve $g$, through which is passed a tape or cord $h$, is folded around a ring $k$, of wood or other suitable material, as shown in the drawings, Fig. 5. The tape $h$ is then strongly stretched and tied at its extremities, whereupon the bag remains suspended from the ring $k$. A large-meshed envelop $l$ is then arranged outside the bag, this envelop being in its turn provided with a sleeve $m$ and tape $n$, its upper edge, owing to the tension of the tape $n$, being turned down over the edge of the bag $i$ around the ring $k$ in such a manner as to cover it. This envelop $l$ serves to prevent the surface of the filter, owing to the distention of the plaits due to the internal pressure of the liquid, from adhering too closely to the inner face of the vessel, as in this case a large part of the filtering-surface would remain unutilized, especially if bags having very narrow plaits arranged close together are employed. All around the edges of the bag $i$ and of the envelop $l$, turned down over the ring $k$, is arranged an india-rubber packing $o$, Fig. 5, whereupon the ring $k$, with its covering constituted by the edges of $i$ and $l$ and by the packing $o$, is placed upon the inner rabbet $j$ of the mouth of the vessel, the mean periphery of which corresponds exactly to that of the ring $k$. After the cover $f$ has been arranged and fixed in position the bag $i$ and its envelop $l$ remain suspended within the vessel, both being held open by the ring $k$, the packing $o$ forming a tight joint externally.

In order to maintain a suitable distance between the envelop $l$ and the inner wall of the vessel, a frame $p$ is adapted to this latter and is formed, for example, by small wooden bars fixed to or removably arranged upon the bottom of the vessel.

In order to obtain a large filtering-surface without increasing the dimensions of the apparatus, the arrangements shown in Figs. 3, 4, and 6 may be adopted.

In accordance with the arrangement shown in Figs. 3 and 4 two bags $i$ are sewed together along the line $r\ r$ and provided with a single sleeve $g$, with a single tightening-tape $h$, and with a single envelop $l$. Instead of two united bags suspended from the same ring three or more may be employed.

Fig. 6 shows a combination of two bags or sleeves provided with the plaits already mentioned, inclosed one within the other in such a manner that instead of a single filtering-surface there are two, and the liquid to be filtered is introduced into a cylindrical or conical ring. The outer sleeve $t$ is suspended in the manner described with reference to the other figures. The inner sleeve $u$ is mounted upon a frame $v$, held together above and below by means of tapes $w$ and $y$. Upon the same frame the lower opening of the sleeve is pressed in the same manner. A second frame $p$, similar to the frame $p$ of Fig. 2, or else a large-meshed envelop, such as that shown in Figs. 3 and 5, serves to prevent any undesirable adherence between the plaits of the sleeve $t$ and the wall of the vessel. A central opening $x$ is reserved at the bottom of the frame $v$ for the passage of the filtered liquid which flows within the sleeve $u$.

Fig. 7 shows a constructional form in which sleeves are employed instead of suspended bags and in which the plaits of the sleeves are directed at right angles to the axis of the sleeves themselves. $z$ is a frame similar to the frame $v$ of Fig. 6, upon which is passed the sleeve $z'$. The length of this latter in a free state is a multiple of that which it presents when mounted and is reduced to the length of the frame by successively compressing the sleeve upon its lower mouth, which is suitably fixed to the base $z''$ of the frame in such a manner as to form the plaits at right angles to its axis in the manner represented. The manner of closing and fixing the sleeve upon the frame which serves to support it is the same as that shown in Fig. 6; but it may of course vary as desired.

The original length of the sleeve with respect to its final length when mounted varies according to the thickness which it is desired to give to the filtering-surface—that is to say, to the number of plaits and the degree of compression which they are to present.

What I claim, and desire to secure by Letters Patent of the United States, is—

1. A filter comprising a vessel, a filter-bag, a supporting-ring located within the edge of the filter-bag, and a packing-ring U-shaped in cross-section and embracing the edge of the filter-bag and the supporting-ring.

2. A filter comprising a vessel, a filter-bag, an envelop, a supporting-ring located within the edges of the filter-bag and the envelop, and a packing-ring U-shaped in cross-section and embracing the edges of the filter-bag and the envelop and the supporting-ring.

3. A filter comprising a vessel having a rabbet and a cover, a filter-bag, a supporting-ring located within the edge of the filter-bag, and a packing-ring U-shaped in cross-section and embracing the edge of the filter-bag and the supporting-ring and seating in the rabbet and held down by the cover of the vessel.

In testimony whereof I have hereunto set my hand, in presence of two subscribing witnesses, this 10th day of July, 1903.

GIORDANO ROSSI.

Witnesses:
 MICHELEDE DRAGO,
 VIRGINIO CARNEVALI.